Patented Sept. 25, 1951

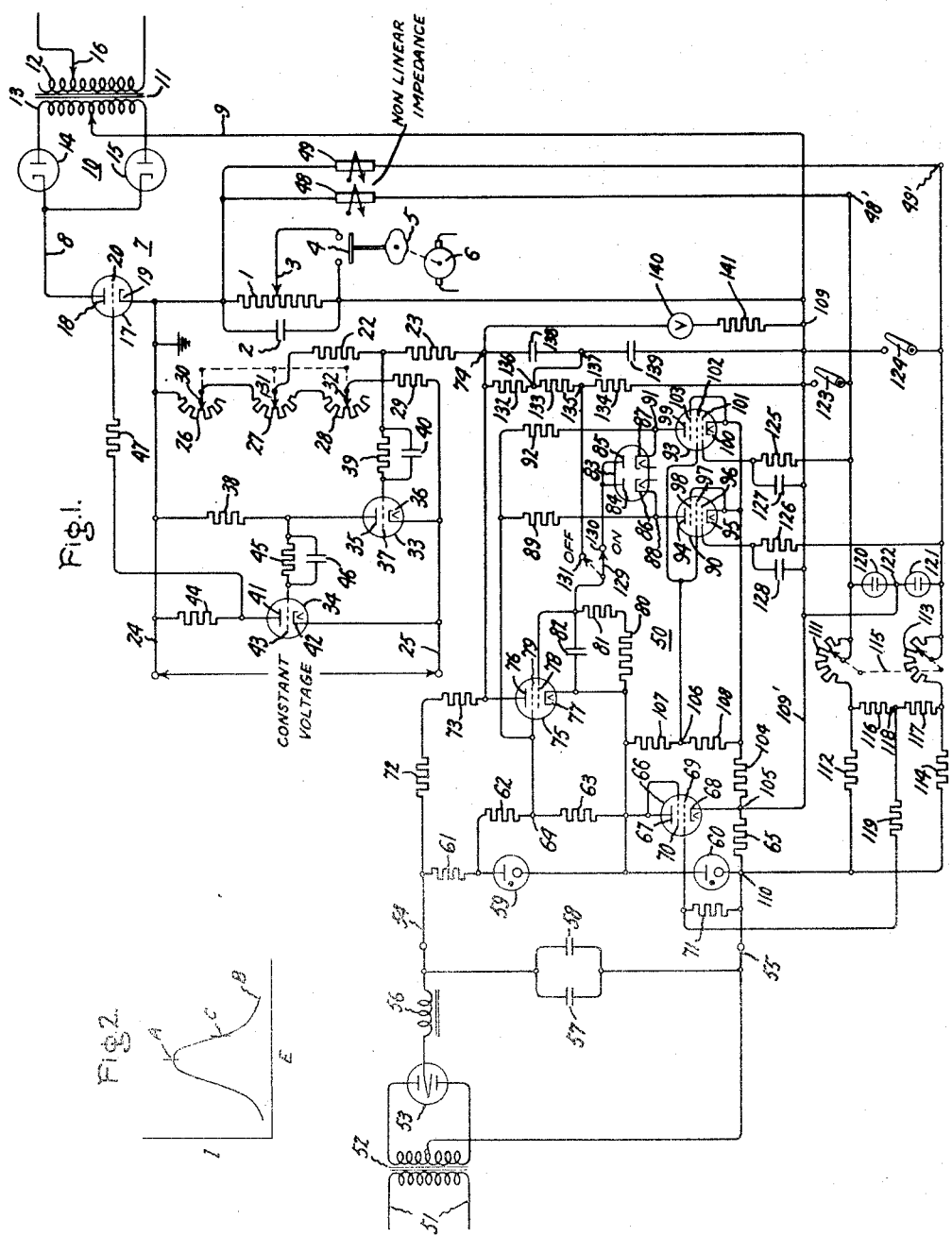

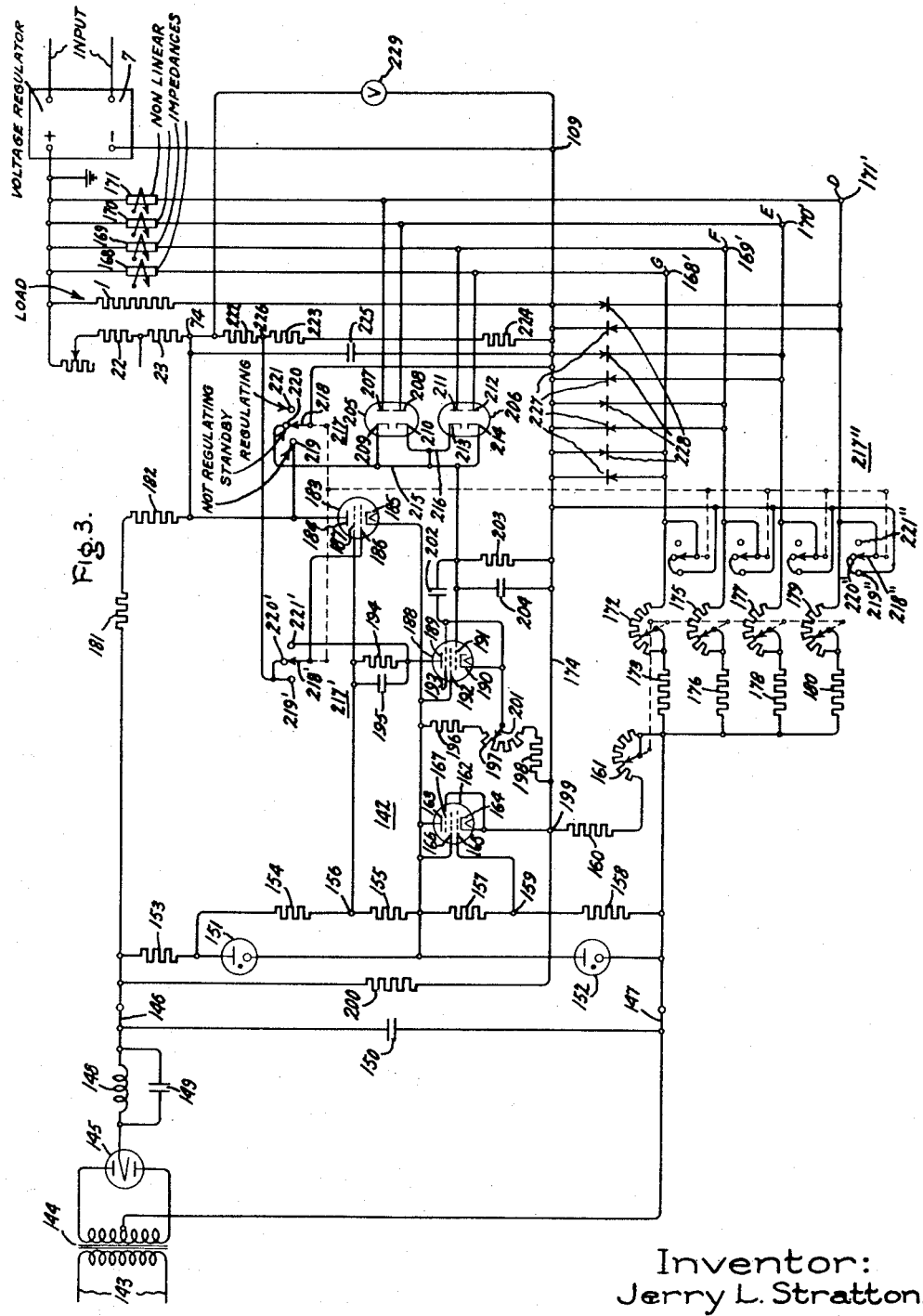

2,569,204

UNITED STATES PATENT OFFICE 2,569,204

ELECTRONIC VOLTAGE REGULATOR

Jerry L. Stratton, Schenectady, N. Y., assignor to General Electric Company, a corporation of New York Application March 31, 1945, Serial No. 585,942

20 Claims. (Cl. 323—22)

My invention relates to an electric regulator and more particularly to an electric regulator of the electronic type for controlling an electrical condition, such as the current or voltage, of a high voltage direct current circuit.

It is an object of my invention to provide a new and improved electric regulator.

It is another object of my invention to provide a new and improved electronic regulating system for controlling both the voltage and current of a load circuit.

It is another object of my invention to provide a new and improved electronic regulating system for controlling the voltage of a load circuit and for modifying the voltage so controlled in accordance with predetermined current conditions of said load circuit.

Although my invention may be utilized in various types of circuits for controlling either the current or the voltage of such circuits, I have found it to be particularly well adapted for use in connection with an electronic voltage regulator or stabilizer of the type utilizing an electronic tube in series with a load circuit and in which the series tube acts as a variable resistance under the control of an electronic amplifier responsive to any deviation of the voltage of the load circuit from the desired value. In the use of the regulator of my present invention in connection with such a series tube type regulator, it functions analogously to a vernier regulator whereby the predetermined voltage level maintained across the load by the series type regulator is changed in response to a component of voltage from the vernier regulator in accordance with certain current conditions in the load circuit which may vary irrespective of the fact that constant voltage is maintained across the load circuit.

My invention will be better understood from the following description taken in connection with the accompanying drawings, and its scope will be pointed out in the appended claims.

In the drawings, Fig. 1 is a diagrammatic illustration of one embodiment of my invention; Fig. 2 is an explanatory diagram relative to the nature of the load circuit; and Fig. 3 is a modification of the embodiment of my invention shown in Fig. 1.

Referring to Fig. 1 of the drawings, I have shown an embodiment of my invention utilized as a modifying current control regulator for a load device having impressed thereacross a constant regulated direct voltage. The load device is represented by a resistor 1 and it may be a load of a fluctuating character and subject to random momentary short circuits. A capacitor 2 is connected in parallel with the resistor 1 to suppress oscillations. The fluctuating character of the load is simulated by means of a shunt circuit 3 connected across a portion of resistor 1 and which is arranged to be closed and opened periodically by a contact 4 shown as being reciprocated by a rotatable cam 5 driven by a motor 6. The means for maintaining a constant direct voltage across the resistor 1 is represented by the regulator 7. The regulator 7 is shown in a very elementary form but is representative of an electronic regulator of the series-tube type. As illustrated, the load circuit 1 is energized from a high voltage direct current supply circuit comprising a positive conductor 8 and a negative conductor 9. The direct current conductors 8 and 9 are energized by a suitable high voltage rectifier 10 which, as illustrated, comprises a transformer 11 having a primary winding 12 and a secondary winding 13 connected through a pair of electronic tubes 14 and 15 arranged for bi-phase half wave rectification. If it is desired to adjust the voltage level of the load circuit 1, voltage adjusting means 16 may be provided. The voltage of the load circuit 1 is controlled by means of an electronic tube 17 having an anode 18, a cathode 19 and a control grid 20. The electronic tube 17 is preferably of the high vacuum type and serves as a variable impedance connected between the supply circuit conductors 8 and 9 and the load circuit 1 to cause a constant voltage to be impressed across the load circuit when regulated in accordance with a slight deviation from the predetermined value. In order to obtain an electrical quantity which indicates a deviation of the voltage from the predetermined value, a voltage divider comprising resistors 22 and 23 is connected across the load circuit 1. The resistor 23 may be of the order of 70 times the value in ohms of resistor 22. A portion of the divider voltage across resistor 22 is compared with an internal voltage standard represented by the conductors 24 and 25. A second voltage divider comprising resistors 26, 27, 28 and 29 is connected across the conductors 24 and 25. Resistors 26, 27 and 28 are provided with adjusting arms 30, 31 and 32, respectively. The arms 30 and 32 may be arranged to be adjusted simultaneously for fine adjustments of the component of reference voltage. The arm 31 is connected to the top of resistor 22 (as viewed in the drawing) so as to compare a component of the reference voltage with a component of voltage from the voltage divider across the load circuit and thereby obtain a difference voltage which is amplified to control the series regulating tube 17. The amplifier is shown in elementary form as comprising a first stage including an electronic tube 33 and a second stage including an electronic tube 34. The tube 33 is provided with an anode 35, a cathode 36 and a control grid 37 and is connected across the conductors 24—25 in series with an anode loading resistor 38. The control grid 37 is connected to the junction of voltage divider resistors 22 and 23 through a resistor 39 and a bypass capacitor 40 so as to impress on the cathode-grid circuit of tube 33 the difference voltage derived from the load voltage divider and the internal standard voltage divider. Tube 34 of the second stage of the amplifier is provided with an anode 41, a cathode 42 and a control grid 43. The tube 34 is connected across the conductors 24—25 in series with an anode resistor 44. The grid 43 of tube 34 is connected to the junction between anode 35 of tube 33 and its anode resistor 38 through a resistor 45 and a bypass capacitor 46. The junction between anode 41 and anode resistor 44 is connected through a resistor 47 to the grid 20 of the series regulating tube 17.

The principle of operation of regulator 7 may be briefly considered at this time in order to facilitate an understanding of the construction and operation of the regulator of my present invention when functioning as a vernier regulator and its coordination with regulator 7 in the complete regulating system. The component of voltage across the resistor 22 of the load voltage divider, acting alone, would bias the grid 37 of tube 33 negative, whereas the component of voltage derived from the internal voltage standard 24—25, acting alone, would bias the grid 37 positive. Since the difference voltage of these two components of voltage is impressed upon grid 37, it will be evident that a tendency for the load voltage to increase would make grid 37 more negative and thereby decrease the anode-cathode current of tube 33. With a decrease in current through resistor 38, the grid 43 of the second stage tube 34 becomes more positive to increase its anode-cathode current which in turn decreases the potential of the grid 20 of the series regulating tube 17 thereby to increase its impedance and compensate for the tendency of the load voltage to increase. A similar but reverse operation takes place for a decrease in the voltage of the load circuit.

The load circuit 1, as illustrated, includes a plurality of supplemental current paths 48 and 49 effectively in parallel with load circuit 1 and which may comprise current conduction by charged positive particles or positive ions through an evacuated space. These current paths 48 and 49 are nonlinear impedance paths which are operated over that portion of the ampere-volt characteristic thereof which may be designated as possessing a negative ampere-volt characteristic since an increase in voltage across the terminals of the path causes a decrease in current, whereas a decrease in voltage causes an increase in current. The general nature of the ampere-volt characteristic of these impedance elements is illustrated in Fig. 2 wherein amperes I are plotted as ordinates and volts E are plotted as abscissae. In connection with the utilization of my invention, it is contemplated that the range of applied voltage will be between the limits indicated at points A and B while the voltage maintained across the load circuit 1 will normally be adjusted to an intermediate value, as indicated by point C. The description of the relation of the current paths 48 and 49 with the vernier regulator, which is designated in whole by the numeral 50, will be deferred until the general construction of this regulator has been described.

The regulator 50 may be designed to operate from a regulated alternating current supply circuit, indicated by conductors 51, of 115 volts, 60 cycles and will operate satisfactorily with a maximum variation of plus or minus 5 volts from the specified circuit voltage. The alternating voltage of conductors 51 is rectified by any suitable rectifier illustrated as comprising a transformer 52 and an electronic rectifier tube 53 arranged for bi-phase half wave rectification. The rectifier supplies direct current to the regulator bus conductors 54 and 55 through a suitable filter indicated by an inductance 56 connected in series with conductor 54 and shunt connected capacitors 57 and 58 connected across the conductors 54 and 55. As previously noted, the regulator 50 functions as a vernier regulator for the voltage regulator 7 and operates to keep the current input to terminals 48' and 49' of the current paths 48 and 49, respectively, at some desired value which, for example, may be of the order of 1 to 10 milliamperes. The current path with the highest current is arranged to control the output of the vernier regulator 50. This vernier regulator comprises, generally speaking, three parts, namely (1) a regulated reference voltage, (2) a direct current amplifier with means for selecting the current path with the highest current input and (3) visual means to indicate variations in the output voltage.

In order to obtain the regulated reference voltage for regulator 50, a pair of glow tubes 59 and 60 are connected in series relation across the conductors 54 and 55 through a current limiting resistor 61. In one circuit of this type with the particular voltage used across conductors 54 and 55, I have found that the tube 59 may be of the type designated VR150–30 and the tube 60 may be of the type designated VR105–30. A voltage divider comprising resistors 62 and 63 is connected across the glow tube 59 and is provided with an intermediate junction terminal 64. A voltage reference resistor 65 is connected across the glow tube 60 in series with a grid-controlled electronic tube 66. Glow tubes of the VR105–30 type have a characteristic such that a current variation of the order of 10 milliamperes through the tube will cause a voltage variation across the tube of the order of 1.5 volts. The grid controlled tube 66 is utilized to regulate or correct for this variation of voltage so that the reference standard will remain constant. The tube 66 is provided with an anode 67, a cathode 68, a control grid 69, and a screen grid 70. The screen grid 70 is maintained at a positive potential by being connected to the same potential as the anode 67. The control grid 69 is connected through a bias resistor 71 to the junction between the reference resistor 65 and the cathode of glow tube 60.

The direct current amplifier and selector section of the rectifier includes resistors 72 and 73 connected in series relation with the direct current supply conductor 54 to an output point 74 which constitutes the positive output terminal of the regulator 50 and this output terminal is connected to the lower terminal of voltage divider resistor 23 of the regulator 7. The potential of terminal 74 is maintained at the desired value by effecting a change in current through resistors 72 and 73 by means of a grid controlled electronic tube 75. Tube 75 is connected in series relation with resistors 72 and 73 across the direct current conductor 54 and the junction between glow tubes 59 and 60. Tube 75 is provided with an anode 76, a cathode 77, a control grid 78 and a screen grid 79. The control grid 78 is connected to the cathode 77 through series connected bias resistors 80 and 81, and a capacitor 82 is connected in parallel with these resistors. The screen grid 79 is maintained at the proper potential with respect to its associated anode by being connected to the cathode through resistor 63 of the voltage divider across glow tube 59. The bias resistors 80 and 81 of tube 75 are connected in series relation with a duplex diode 83 functioning as a selector tube. This selector tube comprises a pair of anodes 84 and 85 connected together and to resistor 81, and a pair of cathodes 86 and 87. Cathode 86 is connected to the junction point 88 between a resistor 89 and an amplifier tube 90. The resistor 89 and tube 90 are connected in series relation between the junction point 64 of voltage divider 62—63 and the direct current conductor 55. In a similar manner, cathode 87 is connected to a junction point 91 between a resistor 92 and an amplifier tube 93. The resistor 92 and tube 93 are connected in a series circuit which is connected in parallel relation with resistor 89 and tube 90. Control tube 90 may be of the pentode type and as shown is provided with an anode 94, a cathode 95, a control grid 96, a screen grid 97 and a suppressor grid 98. Control tube 93 is also shown as of the pentode type comprising an anode 99, a cathode 100, a control grid 101, a screen grid 102 and a suppressor grid 103. The cathodes 95 and 100 of these tubes are connected together and through a cathode resistor 104 to a junction 105 between the reference voltage resistor 65 and the cathode connection of tube 66. The suppressor grids 98 and 103 are connected to their associated cathodes 95 and 100, respectively. The screen grids 97 and 102 are connected together and to a junction point 106 of a voltage divider comprising resistors 107 and 108 connected across the series connected tube 66 and resistor 104. The circuits associated with control grids 96 and 101 of the amplifier tubes 90 and 93 will be described presently after consideration of the circuits associated with current input terminals 48' and 49' and a negative output terminal 109 and an associated negative bus conductor 109'. The negative output conductor 109' is connected to the junction 105 between resistors 65 and 104. The current terminal 48' is connected to the junction 110 of resistor 65 and the negative direct current supply conductor 55 through an adjustable resistor 111 and a fixed resistor 112. The current terminal 49' is similarly connected to junction 110 through an adjustable resistor 113 and a fixed resistor 114. The adjustable resistors 111 and 113 may be arranged to be adjusted simultaneously by any convenient means indicated by the dotted line 115. A voltage divider comprising resistors 116 and 117 having an intermediate terminal 118 is connected between the circuit from current terminals 48' and 49' intermediate the adjustable and fixed resistors of the respective current circuits. The junction point 118 of the last mentioned voltage divider is connected through a resistor 119 to the grid 69 of tube 66 in order to provide the variable grid potential to permit tube 66 to perform its regulating function. A pair of glow tubes 120 and 121 are connected in series relation across the conductors from current terminals 48' and 49' and are provided with an intermediate junction terminal 122 which is connected to the negative conductor 109'. Switching means 123 are provided to connect the current terminal 48' directly to the negative conductor 109' and switching means 124 are similarly provided to connect current terminal 49' directly to negative conductor 109'.

With the description of the circuits from current terminals 48' and 49', it may now be noted that the control grid 101 of tube 93 is connected through a resistor 125 to current terminal 48' and that control grid 96 of tube 90 is connected through a resistor 126 to the current terminal 49'. A by-pass capacitor 127 is connected directly between the grid 101 and the negative conductor 109' while a bypass capacitor 128 is connected directly between the grid 96 and the negative conductor 109'.

Switch 129 having an "on" position when closed to a contact 130 and an "off" position when closed to a contact 131 is provided to put the regulator 50 in and out of service. When switch 129 is moved to its "on" position, the grid 78 of the regulating tube 75 is connected to the anodes of the diode selector tube 83 and regulates in accordance with an electrical condition of the current terminals 48' and 49', whereas when switch 129 is moved to its "off" position the grid 78 of the regulating tube is connected in such a way as to regulate its own output. For this latter purpose, a voltage divider comprising resistors 132, 133 and 134 is connected across the output terminals 74 and 109 of the regulator 50. A junction terminal 135 is provided between resistors 133 and 134 which is connected to the "off" contact 131 and a junction terminal 136 is provided between resistors 132 and 133 which is connected to the junction terminal 137 of two capacitors 138 and 139 connected across the terminals 74 and 109.

Visual indication of the output voltage of regulator 50 is obtained by means of a voltmeter 140 connected in series relation with a resistor 141 across the output terminals 74 and 109.

The operation of the regulator 50 in cooperation with the regulator 7 is substantially as follows: The regulated reference voltage appears across resistor 65. The path of the current from terminal 48', for example, to the negative output terminal 109 is through the resistor 111, resistor 112, resistor 65 to the negative terminal 109. Since in accordance with my invention the voltage drop in resistor 65 must remain constant, the excess current from terminal 48' must be diverted from resistor 65. This is accomplished through having this component of current from terminal 48' diverted through the glow tube 60, which was previously rendered glowing, and down through the tube 66 and back to terminal 109. This current, which may be considered as going through glow tube 60 in the reverse direction, subtracts from the current already flowing in the normal direction. Now since both current terminals 48' and 49' may be carrying, say, 5 milliamperes, the current through the glow tube 60 would be changed by 10 milliamperes. Glow tubes of the VR105–30 type have a characteristic such that over a current variation of 10 milliamperes through the tube, the voltage across the tube varies approximately 1.5 volts. This voltage drop, whatever it may be as a result of the current variation, is generally speaking compensated for or corrected by the action of tube 66. That is, as the current input to terminals 48' and 49' is increased, the grid 69 of tube 66 is biased more positive from the junction terminal 118 and allows more current to pass through this tube. This extra current passes down through resistor 65 which increases the voltage drop across this resistor so that the extra current passed by tube 66 just compensates for the voltage drop across the glow tube 60. In the event the adjustment of resistors 111 and 113 is changed, the potential of the junction terminal 118 is changed in a manner to compensate for the nonlinear characteristic of tube 66.

The direct current amplifier and selector comprises the three grid control tubes 75, 90 and 93 and the diode selector tube 83. Assuming that current terminal 48' has the maximum current and therefore has control, the bias voltage applied to grid 101 of tube 93 is equal to the difference between the reference voltage across resistor 65 and the drop caused by the input current flowing through resistors 111 and 112. Tube 93 has a cathode resistor 104 which desensitizes the effect of its grid voltage a predetermined amount. The grid bias applied to tube 93 determines the potential of the anode 99 of this tube. The anode 99 being connected to the cathode 87 of the selector diode 83 thereby determines the potential of this cathode. The voltage difference between cathode 87 and its associated anode 85 of tube 83 determines the number of microamperes this tube will conduct. With the switch 129 in the "on" position, this current flows through resistors 80 and 81 which determines the grid bias of tube 75. The grid bias of tube 75 also determines its anode potential and, therefore, determines the output voltage of the regulator since the high voltage terminal 74 is connected directly to the anode of tube 75.

It may be helpful to follow the regulating cycle through by assuming an increase of current input at the current terminal 48'. With such an assumed increase of current, the grid bias of tube 93 becomes more positive due to the increased voltage drop across resistors 111 and 112 and thereby lowers the potential of anode 99. This applies a lower potential to the cathode 87 of diode 83 which in effect raises the potential between cathode 87 and its associated anode 85. Tube 83, therefore, draws more current through its electrodes just mentioned and consequently draws more current through resistors 80 and 81. This increase in current through resistors 80 and 81 biases tube 75 more negatively, resulting in a lower current therethrough and a higher anode voltage. The voltage between the output terminals 74 and 109 is thereby increased. Since the current paths 48 and 49 have a nonlinear impedance and are being operated over that part of the characteristic illustrated in Fig. 2, in which an increase of voltage causes a decrease in current, the increase in voltage of the vernier regulator 50 effects the proper compensating action to reduce the current to terminal 48' to its normal regulated value. The current to terminal 49' is controlled in the same manner except that this current circuit utilizes tube 90 and the anode-cathode paths 84 and 86 of diode selector 83. The diode 83 acts only as a selector and will draw current depending upon the potential across the anode and cathode of the controlling path. The current through the diode 83 will be independent of the voltage applied on the non-controlling anode-cathode path so long as this voltage remains below the voltage on the controlling anode-cathode path. The diode 83, therefore, selects current path 48' or 49', whichever one has the higher current, and the regulator 50 regulates this current to the desired value. The setting of resistors 111 and 113 determines the current of paths 48' and 49' at which the regulator operates.

In Fig. 3 I have illustrated a modification of the vernier regulator 50 shown in Fig. 1 wherein means are provided to effect regulation automatically in accordance with the current path having the highest current when there are four current paths. Since voltage regulator 7, or the main regulator, may be of the same type as has been illustrated in Fig. 1, it will be represented very schematically by the rectangular outline labeled accordingly. The vernier regulator is now identified in whole by the numeral 142 and is provided with output terminals which have been assigned the same reference numerals as have been used for vernier regulator 50, namely 74, for the positive terminal or high voltage side and 109 for the negative terminal or low voltage side. As will have been observed from the previous description, the voltage regulator 7 maintains a constant voltage across the voltage divider 22—23 and since the load voltage is the sum of this constant voltage component and the output voltage of the regulator 142, the load voltage will change in accordance with the variation in the output of the regulator 142.

The regulator 142 may be designed to operate from a regulated alternating current supply circuit, indicated by conductors 143, of 115 volts, 60 cycles and may be designed to operate satisfactorily within any desired maximum variation of supply voltage, such as plus or minus 5 volts from the specified circuit voltage. The alternating voltage of conductors 143 is rectified by any suitable rectifier illustrated as comprising a transformer 144 and an electronic rectifier tube 145 arranged for bi-phase half wave rectification. The rectifier supplies direct current to regulator bus conductors 146 and 147 through a suitable filter comprising a combination of an inductance 148 and a shunt capacitor 149 connected in series with conductor 146, and a shunt connected capacitor 150 connected across output conductors 146 and 147.

In order to obtain a regulated reference voltage for regulator 142, a pair of glow tubes 151 and 152 are connected in series relation across the conductors 146 and 147 through a current limiting resistor 153. As explained in connection with the embodiment of Fig. 1, the glow tube 151 may be of the type designated VR150-30 and the glow tube 152 may be of the type designated VR105-30. A voltage divider comprising resistors 154 and 155 connected in series is connected across glow tube 151 and is provided with an intermediate junction terminal 156. A voltage divider comprising resistors 157 and 158 connected in series is connected across glow tube 152 and is provided with an intermediate junction terminal 159. A voltage reference element comprising a fixed resistor 160 and an adjustable resistor 161 connected in series therewith is connected in series relation with a grid controlled electronic tube 162 across the glow tube 152. The reference voltage is furnished primarily by the glow tube 152 although the standard reference voltage is obtained across resistors 160 and 161. The function of the grid controlled tube 162 is to maintain constant the voltage across resistors 160 and 161 regardless of the fact that the current is not constant in the circuit in which these resistors appear. Tube 162 essentially should be of the grid controlled type and, as illustrated, is shown to be of the pentode type having an anode 163, a cathode 164, a control grid 165, a screen grid 166 and a supressor grid 167. The suppressor grid 167 is connected to its cathode in a conventional manner while the screen grid 166 is connected to the anode supply conductor. The control grid is connected to the junction 159 of the voltage divider across tube 152 and is therefore at a constant potential except in so far as the grid potential is modified by the change in current through the voltage standard resistors 160 and 161.

The load circuit, as illustrated, includes a plurality of current paths, supplemental to the load impedance 1, which in this case are represented, by way of example, by the four nonlinear impedance paths 168, 169, 170 and 171. These current paths have the same ampere-volt characteristics as the corresponding impedances 48 and 49 of Fig. 1. However, various modifications have been provided in order to effect control in accordance with the current in that path having the greatest current of the four paths. For ease of identification, the current input terminals of the regulator 142 have been designated 168', 169', 170' and 171' corresponding to the impedances 168, 169, 170 and 171, respectively. For example, the circuit from the high potential or positive terminal of regulator 7 is through the load impedance 168 to terminal 168', from thence through an adjustable resistor 172 and a series connected fixed resistor 173, then through voltage standard resistors 161 and 160, and finally through conductor 174 to the negative terminal 109. The three remaining circuits of impedances 169, 170 and 171 are in parallel relation with the circuit of impedance 168 to the voltage standard resistors 161 and 160 and include resistors 175 and 176, 177 and 178 and 179 and 180, respectively. The adjustable resistors 161, 172, 175, 177 and 179 may be arranged to be adjusted simultaneously in any well known manner as indicated by the dotted line.

The final stage of the regulating section of the regulator includes resistors 181 and 182 connected in series relation with the direct current supply conductor 146 to the output terminal 74 which constitutes the positive output terminal of the regulator 142. The ouput terminal 74 is connected to the lower terminal of the voltage divider 22—23 associated with regulator 7. The potential of terminal 74 is maintained at the desired value by effecting a change in current through the resistors 181 and 182 by means of a grid controlled electronic tube 183. Tube 183 is connected in series relation with resistors 181 and 182 across the glow tube 151 and its series resistor 153. Tube 183 is provided with an anode 184, a cathode 185, a control grid 186 and a second grid 187. The grid 187 is connected to the junction terminal 156 of the voltage divider resistors 154—156 across glow tube 151. The control grid 186 is connected to transfer switching means for different conditions of operation of the regulator to be described presently.

The amplifier section of the regulator includes an amplifier tube 188 provided with an anode 189, a cathode 190, a control grid 191, a screen grid 192 and a suppressor grid 193 and is connected across the voltage divider resistor 155. The anode 189 is connected through an anode loading resistor 194 and a by-pass capacitor 195, in parallel therewith, to the junction terminal 156 of voltage dividing resistor 155 across glow tube 151. A voltage divider circuit comprising series connected resistors 196, 197 and 198, which are connected in series relation with the previously described voltage standard resistors 160 and 161, are connected in effect across the glow tube 152. A junction terminal 199 between resistors 198 and 160 is connected through a resistor 200 to the positive lead 146 of the supply rectifier. The resistor 197 is preferably made adjustable and is provided with an adjusting arm 201 which is connected to the cathode 190. This resistor 197 provides means of adjusting the voltage that the regulator 142 will maintain. The suppressor grid 193 is connected to its associated cathode in a conventional manner and the screen grid 192 is connected to the lower terminal, as viewed in the drawing, of voltage divider resistor 155. A capacitor 202 is connected between the suppressor grid 193 and the control grid 191. The control grid 191 is also connected to the negative bus 174 of the regulator through a resistor 203. A by-pass capacitor 204 is connected in parallel to resistor 203.

The selector function of the regulator 142 is effected by means of two duplex diode rectifiers 205 and 206. The selector tube 205 is provided with a pair of anodes 207 and 208 and a pair of cathodes 209 and 210 associated respectively, with the anodes 207 and 208. Similarly, the selector tube 206 is provided with a pair of anodes 211 and 212 and a pair of cathodes 213 and 214 associated, respectively, with the anodes 211 and 212. The anodes 207, 208, 211 and 212 are connected to the current circuits of impedances 171, 170, 169 and 168, respectively. The cathodes 209 and 214 are connected together through conductor 215 which in turn is connected to the control grid 191 of tube 188. Cathodes 210 and 214 are also connected together through conductor 216 which in turn is connected to conductor 215 and thus also to the grid 191 of tube 188.

A gang switch 217 is provided for putting the regulator 142 in and out of service, and includes two supplementary sections 217' and 217" which are operated simultaneously and correspondingly with switch 217 as indicated by the dotted lines. Switch 217 is provided with a movable contact 218 which has three cooperating stationary contacts 219, 220 and 221. Supplementary switch sections 217' and 217" are each similarly provided with a movable contact and three cooperating stationary contacts identified, respectively, in the order named by 218', 219', 220' and 221', and 218", 219", 220" and 221". As viewed in the drawing, the counterclockwise position of movable contact 218 as well as 218' and 218" may be referred to as the "Non-Regulating" position; the midposition may be designated as the "Standby" position, and the clockwise position may be designated as the "Regulating" position.

When switch arm 218 is in the counterclockwise position, it will be noted that the output terminals 74 and 109 of the regulator are short circuited. At the same time and in a similar manner, the movable arm 218" of switch section 217" connects the several current input terminals 168' to 171' to negative conductor 174 and thereby short circuits the current input terminals. The switch section 217' modifies the grid connections of tube 183 and the anode connection of tube 188. Thus, when contact arm 218' is in the counterclockwise position corresponding to the "nonregulating" position of switch 217, the control grid 186 of tube 183 is connected in such a way as to control its own output. This is effected by the use of a voltage divider comprising resistors 222, 223 and 224 connected in series relation across the regulator terminals 74 and 109. A by-pass capacitor 225 is connected in shunt to this voltage divider. A junction terminal 226 is provided between voltage divider resistors 222 and 223 and is connected to the stationary terminal 219' which in turn is also connected to terminal 220'.

When the switch arm 218 is moved to the midposition or "standby" position, the duplex diode tubes 205 and 206 relative to the control grid circuit of tube 188 are bypassed so that the control of tube 188 is independent of the selector tubes. At the same time the switch arm 218' in its midposition does not change the grid connection of tube 183 previously described so that this tube regulates its own output in accordance with the potential derived from the voltage divider junction terminal 226. It will also be noted that switch arms 218'' of switch 217'' in its midposition still maintains the short circuit between the current input conductors 168' to 171' and the negative output terminal 109.

When the switch arms 218, 218' and 218'' are moved to the clockwise or regulating position, the regulator 142 operates in the normal manner placing the selector tubes in an operative circuit connecting the grid 186 of tube 183 to the anode of tube 188 and opening the short circuit paths between the negative terminal 109 and the current terminals 168' to 171'.

In a particular service for which the regulator 142 has been applied, it is required that the voltage between the negative bus terminal 109 and the current input terminals be maintained within a given value regardless of the current to the several current input terminals, or whether or not the regulator is performing its regulating operation. To provide for this condition, I employ nonlinear impedances with a negative impedance-voltage characteristic connected between each of the current terminals 168' to 171' and the negative bus terminal 109. A suitable nonlinear impedance of the desired impedance-voltage characteristic has been found to be selenium rectifier disks. Accordingly, one group of selenium rectifiers 227 poled in one direction are connected between the four current input terminals 168' to 171' and the negative bus terminal 109, and a second group of selenium rectifiers 228 poled in the opposite direction are connected between the same current input terminals and the negative bus terminal 109. In a particular embodiment of my invention, a value of plus or minus 0.1 volt is required to be maintained between the current input terminals and the negative bus terminal 109 when the regulator is in service. However, during transient conditions the regulator may be forced out of range and the voltage during the transient period should be maintained within approximately plus or minus 1 volt. The resistance characteristic of selenium rectifier disks is such that when the voltage across the rectifier disk is less than 0.3 to 0.5 volt its resistance is very high. When the voltage across the disk exceeds 0.5 volt, its resistance decreases rapidly. Thus, when the voltage of regulator 142 exceeds the desired range the shunting effect of the selenium rectifiers increases until the voltage is limited at the desired value.

The output voltage of the regulator 142 may be observed by means of a voltmeter 229 or any other suitable voltage indicating device connected across the terminals 74 and 109.

The operation of the illustrated embodiment of Fig. 3 is substantially as follows: It will be assumed that the supply circuit 143 is energized and that gang switch 217 and its supplementary sections 217' and 217'' are in the clockwise or regulating position. It will also be assumed that the current input to terminal 168' is the greatest of the four so that operation is being effected in accordance with the conditions existing between terminals 168' and 109. The reference voltage is primarily furnished by the glow tube 152 with a portion of this voltage appearing across resistor 158 which is applied to the grid 165 of the voltage reference regulating tube 162. Tube 162 is to maintain constant voltage across the voltage reference resistors 160 and 161 regardless of the fact that the current in the circuit including these resistors is not constant. Thus, if the current from the current terminals 168' to 171', either singly or in combination, increases, the net voltage drop across resistors 160 and 161 would decrease since the current from the current input terminals is opposite to the anode current of the regulating tube 162. This net change of voltage makes the cathode of tube 162 less positive and, hence, its grid less negative so that its anode current increases, bringing the voltage across resistors 160 and 161 back to the normal value. The reverse operation occurs for a decrease in current from the current input terminals 168' to 171' to cause the voltage across resistors 160 and 161 to return to the normal value. Now if the current from terminal 168' is of such a value that for a given setting of resistor 161 the voltage drop across resistors 172 and 173 is slightly greater than the voltage across the reference voltage resistors 160 and 161, a slight positive potential will appear on anode 212 of selector tube 206. This change of potential will cause a current to flow in resistor 203 connected in the cathode circuit of selector tube 206 and thereby cause the grid 191 of amplifier tube 188 to be less negative with respect to its cathode. As a result, more anode current flows in the anode loading resistor 194 of tube 188 which renders the control grid 186 of tube 183 more negative so that tube 183 conducts less current. This decrease in current through tube 183 decreases the voltage drop through the series regulating resistors 181 and 182 and thereby effects an increase in the voltage at the output terminals 74—109 of the regulator. Since the impedance paths 168 to 171 have a negative impedance-voltage characteristic the increase in voltage reduces the current in the current paths to the desired value.

In the foregoing description of the operation it was assumed that the current to input terminal 168' was the largest. However, as previously noted, the regulator 142 automatically selects the current input terminal of the four paths having the greatest current for regulation. Let it now be assumed that the current flowing to input terminal 169' is slightly greater than the current to 168'. This would make the anode 211 of selector tube 206 more positive than anode 212. The current in resistor 203 would then increase, ultimately cutting off the current in anode 212 of tube 206 by making the cathode more positive than the anode 212. Since the potential of all of the cathodes of the several selector tubes is determined by the anode which is most positive, then the voltage of the grid of the amplifier tube 188 is a function of the current in the current input terminal receiving the largest current.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of constant voltage, a second source of voltage, a pair of output terminals across which said sources of voltage are connected in series relation, a load circuit connected to be energized from said output terminals, said load circuit having a negative impedance-voltage characteristic, and means responsive to the current of said load circuit for varying the voltage of said second source inversely with variations of the current in said load circuit.

2. In combination, a source of voltage, means for maintaining said voltage at a substantially constant value, a second source of voltage, a pair of output terminals, means for connecting said sources of voltage in series relation to energize said output terminals, a load device connected to be energized from said output terminals, an impedance path connected across said output terminals in parallel relation with said load device, said impedance path having a negative impedance-voltage characteristic, and means responsive to the current traversing said impedance path for varying the voltage of said second source inversely with departures of said current above or below a predetermined value.

3. In combination, a source of voltage having a pair of output terminals, a load circuit connected to be energized from said output terminals, an electronic tube having a control electrode and being interposed in series relation between said source and one of said output terminals, a voltage divider connected across said load circuit for providing a component of voltage proportional to the voltage of said load circuit, a source of constant reference voltage, means connected to the control electrode of said tube and responsive to the difference between said component of voltage from said voltage divider and said source of constant reference voltage for maintaining a component of voltage of constant magnitude across said load circuit, means connected in circuit with said output terminals for producing a variable component of voltage in said load circuit, and means for varying the voltage of said last mentioned means in accordance with the variations of current in said load circuit.

4. In combination, a source of regulated constant voltage, a pair of output terminals therefor, a load device connected across said output terminals, a voltage divider connected across said load device for providing a component of voltage proportional to the voltage of said load device, an electronic regulator having output terminals interposed in series relation with said voltage divider and including an electronic tube, an impedance path connected in parallel relation with said load device across said first mentioned output terminals, said impedance path having a negative impedance-voltage characteristic, and means responsive to the current of said impedance path and including said electronic tube for varying the voltage between the output terminals of said electronic regulator in a manner to maintain the current in said impedance path at a predetermined value.

5. In combination, a source of voltage, means for maintaining said voltage at a substantially constant value, a second source of voltage, a pair of output terminals, means for connecting said sources of voltage in series relation to energize said output terminals, a load device connected to be energized from said output terminals, a pair of impedance paths connected across said output terminals in parallel relation with said load device, said impedance paths having a negative impedance-voltage characteristic, means for varying the voltage of said second source, and means for selectively controlling said means in accordance with the current of the impedance path having the greater current.

6. In an electronic regulator, a unidirectional voltage circuit comprising a pair of terminals, a first circuit including a glow discharge voltage stabilizing tube connected across said terminals, an electric circuit path including a resistor connected across said glow discharge tube, said resistor having a common junction terminal with said glow discharge tube for providing a constant reference voltage for said regulator, an electronic tube being provided with an anode, a cathode and a control electrode and having its anode-cathode circuit connected in series relation with said resistor in said electric circuit path across said glow discharge tube, an intermediate junction terminal between the cathode of said electronic tube and said resistor, a current output circuit connected to said intermediate terminal, a current input circuit connected to said common junction terminal, and means including a bias resistor connected in circuit with said control electrode for increasing the conductivity of said electronic tube in response to current variations through said glow tube above a predetermined value.

7. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an electric discharge path comprising an anode and a cathode, said anode being connected to said bias resistor, an amplifier electronic tube connected to be energized from said direct current circuit and comprising an anode, a cathode and a control electrode, the anode of said amplifier tube being connected to the cathode of said electric discharge path, a cathode conductor connected to the cathode of said amplifier tube and to said direct current circuit and having included therein a voltage reference resistor, a control circuit interconnecting the control electrode of said amplifier tube and its cathode and including therein a bias resistor, and a current circuit arranged to circulate a current through said last mentioned bias resistor for changing the voltage across said output terminals.

8. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, a pair of electric discharge paths comprising a pair of anodes and a pair of cathodes arranged one for each of said anodes, said anodes being connected together and to said bias resistor, a pair of amplifier electronic tubes connected to be energized from said direct current circuit and each comprising an anode, a cathode, and a control electrode, the respective anodes of said amplifier tubes being connected to a different one of said pair of cathodes, the cathodes of said amplifier tubes being connected together and being provided with a common cathode conductor connected to said direct current circuit, a voltage reference resistor interposed in said common cathode conductor, a pair of control circuits arranged one for the control electrode of each of said amplifier tubes and each circuit including a different bias resistor connected between each control electrode and its associated cathode through said voltage reference resistor, and a different current circuit connected to each of said last mentioned bias resistors and arranged to circulate current through the associated bias resistors of said amplifier tubes for changing the voltage across said output terminals inversely with the current variations in the current circuit traversed by the greater current.

9. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, a pair of electric discharge paths comprising a pair of anodes and a pair of cathodes arranged one for each of said anodes, said anodes being connected together, a voltage divider having an intermediate junction terminal and connected across said output terminals, switching means connected to the control electrode of said regulating tube for selectively connecting said control electrode to said intermediate junction terminal or to said pair of anodes, a pair of amplifier electronic tubes connected to be energized from said direct current circuit and each comprising an anode, a cathode, and a control electrode, the respective anodes of said amplifier tubes being connected to a different one of said pair of cathodes, the cathodes of said amplifier tubes being connected together and being provided with a common cathode conductor connected to said direct current circuit, a voltage reference resistor interposed in said common cathode conductor, a pair of control circuits arranged one for the control electrode of each of said amplifier tubes and each circuit including a different bias resistor connected between each control electrode and its associated cathode through said voltage reference resistor, a different current circuit connected to each of said last mentioned bias resistors and arranged to circulate current through the associated bias resistors of said amplifier tubes for changing the voltage across said output terminals inversely with the current variations in the current circuit traversed by the greater current, and switching means connected to each of said different current circuits for bypassing current around said voltage reference resistor.

10. A direct current power supply system having a pair of output terminals and including a direct current input circuit and an impedance element connected in series relation between said input circuit and said output terminals, a regulating electronic tube connected to said impedance element for varying the current therethrough, said elecontric tube being provided with an anode, a cathode and a control electrode, a control electrode circuit including a bias resistor connected between said control electrode and its associated cathode, a pair of electric discharge paths comprising a pair of anodes and a pair of cathodes arranged one for each of said anodes, said anodes being connected together and to said bias resistor, a pair of amplifier electronic tubes connected to be energized from said direct current circuit and each comprising an anode, a cathode, and a control electrode, the respective anodes of said amplifier tubes being connected to a different one of said pair of cathodes, the cathodes of said amplifier tubes being connected together and being provided with a common cathode conductor connected to said direct current circuit, a voltage reference resistor interposed in said common cathode conductor, a pair of control circuits arranged one for the control electrode of each of said amplifier tubes and each circuit including a different bias resistor connected between each control electrode and its associated cathode through said voltage reference resistor, a different current circuit connected to each of said last mentioned bias resistors and arranged to circulate current through the associated bias resistors of said amplifier tubes for changing the voltage across said output terminals inversely with the current variations in the current circuit traversed by the greater current, and means for adjusting said last mentioned bias resistors for selecting the value of the current input from said different current circuits at which regulation is effected.

11. In an electronic voltage regulator, a voltage reference resistor, a current input circuit connected to said resistor for circulating a variable current therethrough, means comprising a glow discharge tube for providing a constant component of voltage, means comprising an electronic tube provided with an anode, a cathode and a control electrode and having its anode-cathode circuit connected in series relation with said voltage reference resistor across said glow discharge tube, and a control circuit interconnecting said control electrode of said electronic tube and its associated cathode and having a voltage variable in accordance with the current of said current input circuit for varying the current through said electronic tube inversely with variations in the current traversing said voltage reference resistor from said current input circuit in a manner to maintain the voltage drop across said voltage reference resistor substantially constant.

12. In an electronic voltage regulator, a unidirectional voltage circuit comprising a pair of terminals, a first circuit connected across said terminals and including a glow discharge voltage stabilizing tube, a voltage divider connected across said glow discharge tube and comprising two series resistance elements provided with an intermediate junction terminal, a voltage reference resistor for providing a constant reference voltage for said regulator, an electronic tube being provided with an anode, a cathode and a control electrode and having its anode-cathode circuit connected in series relation with said voltage reference resistor across said glow discharge tube so as to provide a junction terminal between said resistor and glow discharge tube, means for interconnecting the intermediate terminal of said voltage divider and said control electrode, a current output circuit connected to the junction between said electronic tube and said voltage reference resistor, and a current input circuit connected to the junction terminal between said voltage reference resistor and said glow discharge tube.

13. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, and means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube.

14. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of adjustable bias resistors arranged one in circuit with each of said variable input circuits and having one pair of terminals connected together at a common terminal, an adjustable voltage reference resistor interposed in series relation between said common terminal and one of said output terminals, means for simultaneously adjusting said adjustable resistors, and means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube.

15. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube, and means including a pair of nonlinear impedances having conjointly a low impedance above and below a predetermined value of applied voltage connected between each of said current input circuits and one of said output terminals.

16. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube, and means including a pair of oppositely disposed selenium type rectifiers connected between each of said current input circuits and one of said output terminals.

17. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube, and means for selectively bypassing said voltage reference resistor and the bias resistors in each of said variable current input circuits.

18. A direct current power supply system having a pair of output terminals and including a direct current input circuit and an impedance element connected in series relation between said input circuit and said ouput terminals, a regulating electronic tube connected to said impedance element for varying the current therethrough, said electronic tube being prvoided with an anode, a cathode and a control electrode, a control electrode circuit including a bias resistor connected between said control electrode and its associated cathode, an amplifier electronic tube having an anode, a cathode and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, two pairs of variable input circuits all connected in parallel relation between said output terminals, a plurality of bias resistors arranged one in circuit with each of said variable input circuits and having one set of terminals of each of said plurality of bias resistors connected together at a common terminal, a voltage reference resistor interposed in series relation between said common terminal and one of said output terminals, and means for causing variation in the current traversing the bias resistor of said amplifier tube in accordance with current variations in the current input circuit of said pairs of current input circuits having the greatest current comprising two pairs of electric discharge paths including two pairs of anodes connected respectively to a different one of said current input circuits and two pairs of cathodes connected together and to the control electrode of said amplifier tube.

19. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode, and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube, a voltage divider comprising a plurality of resistors connected in series relation across said output terminals and being provided with an intermediate junction terminal, a first switching means connected to the control electrode of said regulating tube for selectively transferring said control electrode from its said bias resistor to said intermediate junction terminal, a second switching means connected to said one of said output terminals and having a plurality of operating positions for selectively short circuiting said output terminals or by-passing said electric discharge paths.

20. A direct current power supply system having a pair of output terminals and including a direct current input circuit and an impedance element connected in series relation between said input circuit and said output terminals, a regulating electronic tube connected to said impedance element for varying the current therethrough, said electronic tube being provided with an anode, a cathode and a control electrode, a control electrode circuit including a bias resistor connected between said control electrode and its associated cathode, an amplifier electronic tube having an anode, a cathode and a control electrode and having its anode-cathode circuit connected in series relation with said bias resistor of said regulating electronic tube across said input circuit, a control electrode circuit for said amplifier tube including a bias resistor connected between the control electrode and cathode of said amplifier tube, a pair of variable input circuits connected in parallel relation between said output terminals, a pair of bias resistors arranged one in circuit with each of said variable input circuits and having one pair of terminals connected together at a common terminal, a voltage reference resistor interposed in series relation between said common terminal and one of said output terminals, means for causing variation in the current traversing the bias resistor of said amplifier tube in accordance with the current variations in said current input circuit having the greater current comprising a pair of electric discharge paths including a pair of anodes connected respectively to a different one of said current input circuits and a pair of cathodes connected together and to the control electrode of said amplifier tube, a voltage divider comprising a plurality of resistors connected in series relation across said output terminals and being provided with an intermediate junction terminal, a first switching means connected to the control electrode of said regulating tube for selectively transferring said control electrode from its said bias resistor to said intermediate junction terminal, a second switching means connected to said one of said output terminals and having a plurality of operating positions for selectively short circuiting said output terminals or by-passing said electric discharge paths, a third switching means for selectively by-passing said voltage reference resistor and the bias resistors in each of said variable current input circuits, and means for simultaneously operating said switching means.

JERRY L. STRATTON.

No references cited.